United States Patent [19]

Ishizuka

[11] Patent Number: 5,471,357
[45] Date of Patent: Nov. 28, 1995

[54] MAGNETIC DISK DRIVE DEVICE HAVING A LIQUID INSULATING MATERIAL PROVIDED IN DIFFERENT THICKNESSES ON AN IRON CORE

[75] Inventor: Yutaka Ishizuka, Nagano, Japan

[73] Assignee: Kabushiki Kaisha Sankyo Seiki Seisakusho, Nagano, Japan

[21] Appl. No.: 200,511

[22] Filed: Feb. 23, 1994

[30] Foreign Application Priority Data

Feb. 23, 1993 [JP] Japan .................. 5-12009 U

[51] Int. Cl.⁶ .................................. G11B 17/02
[52] U.S. Cl. .................................. 360/99.08
[58] Field of Search ............... 360/99.08, 99.04, 360/98.07; 310/68 R, 181, 185

[56] References Cited

U.S. PATENT DOCUMENTS 4,965,476  10/1990  Lin ..................... 360/99.08

FOREIGN PATENT DOCUMENTS 63-59742  3/1988  Japan .
4168940   6/1992  Japan .

*Primary Examiner*—Robert S. Tupper
*Attorney, Agent, or Firm*—Sughrue, Mion, Zinn, Macpeak & Seas

[57] ABSTRACT

A multi-layered insulating film of different thicknesses and which is easily formed on an iron core of the multipole structure in a magnetic disk drive device. The thickness of the insulating film is reduced at the narrowly spaced proximal portions of the salient poles of an iron core. The thickness may also be reduced at a midpoint in the laminating direction of the core as compared with the top and bottom end portions in the laminating direction. The coating can more easily be applied by spraying the liquid insulating film on the proximal portions of the iron core which are difficult to access. The strength of the resultant insulating film is satisfactory.

7 Claims, 3 Drawing Sheets

MAGNETIC DISK DRIVE DEVICE HAVING A LIQUID INSULATING MATERIAL PROVIDED IN DIFFERENT THICKNESSES ON AN IRON CORE

BACKGROUND OF THE INVENTION

1. Field of the Invention

The present invention relates to a magnetic disk drive device for driving and rotating a magnetic disk set to a hub.

2. Related Art

A magnetic disk drive device constructed as shown in FIG. 5 has been known.

In the figure, a fixed shaft 2 is erected on a frame 1. A laminated iron core 3 is secured to a large diameter portion 2a of a lower portion of the fixed shaft 2. A coil 4 is put on the iron core 3. A pair of bearings 5 and 6 are secured to the outer surface of a small diameter portion 2b or an upper portion of the fixed shaft 2 in a state that the bearings 5 and 6 are arrayed in the axial direction of the magnetic disk drive device. The pair of bearings 5 and 6 allows the hub 7 to turn about them.

The inner rings 5a and 6a of the pair of bearings 5 and 6 are bonded to the outer surface of the fixed shaft 2. A hub 7 shaped like a hollow shaped tube is secured to the outer rings 5b and 6b of the pair of bearings 5 and 6. A magnetic disc, not shown, is put around the hub 7.

A skirt portion 7a is formed in the lower portion of the hub 7. A drive magnet 8, shaped like a ring, is fastened to the inner wall of the skirt 7a in a state that the drive magnet 8 faces the outer surface of the iron core 3 with a gap therebetween and are arranged in a circle form.

An electric wire (lead wire) 9 for applying a drive voltage to the coil 4 of the iron core 3 is led out of the motor through a through hole formed in the frame 1.

A collar 11 made of magnetic material, shaped like a hollow tube, is fit to the upper end portion of the fixed shaft 2 (as viewed in the drawing). A magnetic fluid seal 12 is applied to the opening defined between the outer surface of the collar 11 and the inner surface of the hub 7.

A magnetic fluid 12a within the inner surface of the magnetic fluid seal 12 comes in close contact with the outer surface of the collar 11. The magnetic fluid isolates the pair of bearings 5 and 6 from the outside of the magnetic disk drive device. A seal cover 13, disposed above the magnetic fluid seal 12, prevents the magnetic fluid 12a from being scattered outside.

The iron core 3 and the coil 4 put on the iron core 3 will be described with reference to FIG. 6. As shown, the iron core 3 consists of a ring-like portion 15 and a plural number of salient poles 14 radially protruded from the outer circumferential edge of the ring-like portion 15.

Each salient poles 14 consists of an arcuately extended part 16 extending in arc-shaped at an outer end portion and an arm 17 arranged between the ring-like portion 15 and the arcuately extended part 16 in such a manner that the arm 17 is narrower in width than the arcuately extended part 16. The coil 4 is wound around the arm 17 of the salient poles 14 with a predetermined number of turns.

The iron core 3 consists usually of laminated thin magnetic plates, as shown in FIG. 5. In order to prevent the motor from failing to function (viz., rendering the resultant motor inoperative), which will occur if any coil 4 is short-circuited through the iron core 3, the surface (particularly of the arm 17 wound by the coil 4) of each of the salient poles 14 is insulated from the coil 4.

The insulating film is formed on the surface of the coil 4. However, the rubbing of the coil 4 and temperature changes when the motor is driven and stopped may crack the insulating film, resulting in poor insulation.

To avoid the latter problem, the insulating film is formed on the surface of each salient pole 14.

One of the possible ways to insulate the surface of each salient pole 14 from the coil 4 is to form an insulating film on the surface of the iron core 3 including the salient poles 14.

To realize this, an electrostatic powder coating method may be used. In this method, insulating plastic powder (e.g., epoxy resin powder) is electrostatically attached to the surface of the iron core 3. Then, it is high frequency heated to be sintered.

The insulating film thus formed is about 0.3 mm thick. However, the thickness of the insulating film hinders the reduction of the motor size.

This insulating film is nonuniform in thickness, thus producing an uneven surface.

As see from FIG. 6, the number of turns of the coil 4 is limited by the space between the proximal portions of the arms 17 of the adjacent salient poles 14. In addition to this, the large film thickness and the uneven surface of the insulating film formed by the electrostatic powder coating method make it difficult to increase the number of turns of the coil 4. Because of this, the torque of the magnetic disk drive device cannot be increased.

In the multi-pole structure having an increased number of salient poles 14, the space between the proximals of the adjacent salient poles 14 is necessarily narrowed. The coil winding work is inefficient since the salient pole having the coil already put thereon is an obstacle to the coil winding work of the poles adjacent thereto.

SUMMARY OF THE INVENTION

Accordingly, an object of the present invention is to provide a magnetic disk drive device which allows the reduction of the thickness of the disk drive device and the size of the overall device, while keeping a required drive torque thereof.

According to an aspect of the present invention, there is provided a magnetic disk drive device comprising: a rotatably supported, hub for setting a magnetic disc adapted to rotate thereon; a drive magnet secured to the hub; an iron core disposed in opposition to the drive magnet, the iron core having a plurality of salient poles radially protruding from the iron core, and a surface of the iron core being coated with a multilayered film made of liquid insulating material.

According to the present invention, with the feature of the reduced thickness of the insulating film on the narrowly spaced proximal portions of a multiple of the salient poles, the number of turns of the coil may be increased when comparing with that of the conventional device. This leads to an increase of the motor torque in the magnetic disk drive device.

Further, the thickness $t_B$ of the mid portions of both sides of the insulating film around the pole is equal to or smaller than the thickness $t_A$ of the top and bottom of each side of the insulating film. The space between the adjacent poles, thus secured, makes it easier to wind the coil around the poles.

DETAILED DESCRIPTION OF THE PREFERRED EMBODIMENTS

The preferred embodiment of a magnetic disk drive device according to the present invention will be described with reference to the accompanying drawings.

Figure 1:
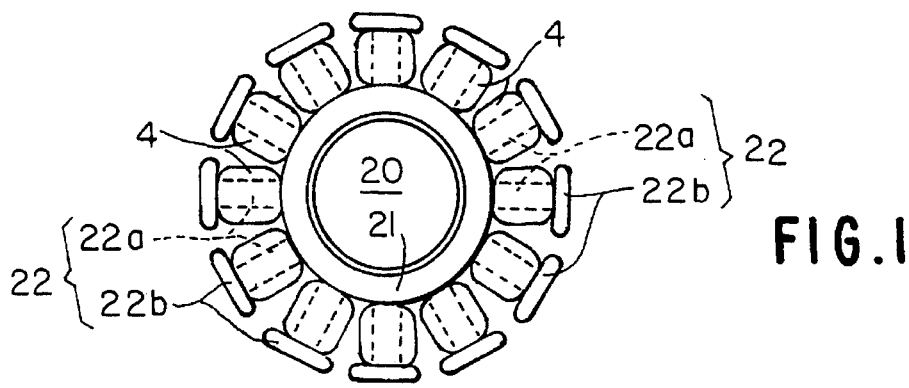
FIG. 1 is a plan view showing an iron core of the multipole structure used in a magnetic disk drive device according to the preferred embodiment of the present invention.

FIG. 1 is a plan view showing an iron core of the multipole structure used in a magnetic disk drive device according to the preferred embodiment of the present invention. The construction of the overall magnetic disk drive device of this embodiment is substantially equal to that of the conventional magnetic disk drive device already described. The description thereof is omitted here.

As shown in FIG. 1, an iron core 20 of this embodiment is of the multipole construction consisting of a number of laminated electromagnetic steel plates. Twelve salient poles 22 radially protrudes from the outer circumferential edge of a ring-like portion 21.

The coil 4 of a predetermined number of turns is wound on the arm 22a of each salient pole 22. An arcuately extended part 22b for collecting magnetic paths is provided at the top of the arm 22a.

Figure 2:
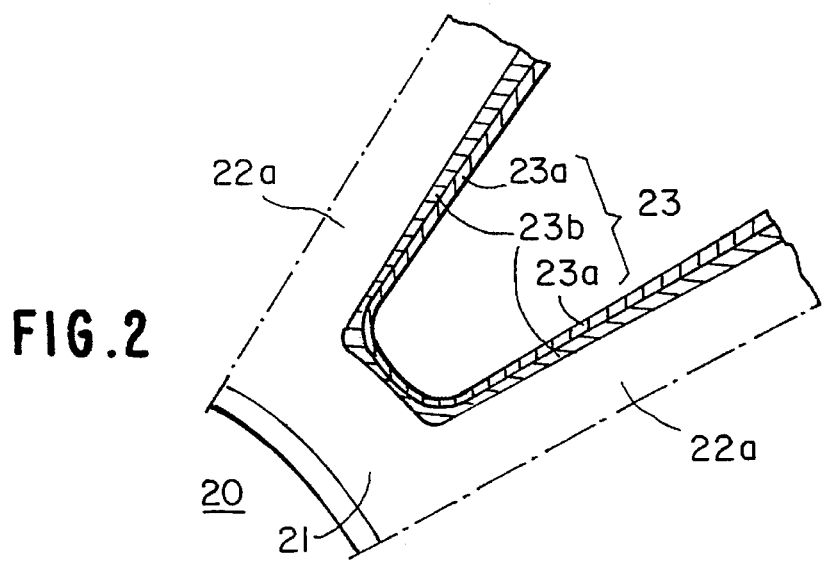
FIG. 2 is an enlarged, partial plan view showing the proximal portion of the iron core in which the insulating film is varied in thickness FIGS. 3(a) and (b) are enlarged cross sectional views showing the proximal portion of the iron core in which the insulating film is varied in thickness.

As shown in FIG. 2, the surface of the iron core 20 is entirely coated with a insulating film 23 consisting of two films 23a and 23b.

The insulating films 23a and 23b forming the insulating film 23 are formed by coating drying liquid insulating material. The liquid insulating material may be any of rust-proof and extender pigment, such as epoxy resin and calcium carbonate, colored pigment, such as titanium, aromatic solvent, alcohol solvent, ketone solvent, transparent ceramic coating, and the like. The ceramic coating may contain a blend of any of the following resin, and any of the following solvent at a proper compounding ratio. The resin are special silicate modified polyether resin, special silicate modified acrylic resin, and polyether resin. The solvents are hydrogen carbon solvent, alcohol solvent, ester solvent, ether solvent, and ketone solvent.

An embodiment of the invention where the insulating films 23a and 23b of the insulating film 23 are thinned in the proximal portion of each salient pole 22 will be described.

As shown in FIG. 2, the insulating films are relatively thick in the portion closer to the top (arcuately extended part) of the salient pole, and gradually reduced toward the proximal portion of the salient pole 22.

The film at the root portion of the salient pole 22 is selected so as to obtain sufficient insulating resistance and breakdown voltage, which depends on the specifications of a motor used for the magnetic disk drive device. In this instance, it is approximately 50 µm.

The insulating films in the top portion of the salient pole 22 is at least 50 µm thick. In our products, any of the values 60 to 80 µm thick is used.

The technical idea that the insulating film in the top portion of the salient pole is thicker than that in the proximal portion, allows one to increase the number of turns of the coil at the top or distal portion as compared with the number of turns in the proximal portion. The result is to increase the motor torque.

The thick insulating film in the top portion of the salient pole is capable of withstanding the pressure caused by the coil wound around that portion. Therefore, it is possible to wind more turns of the coil on the pole without the increased pressure pushing through the insulation and shortcircuiting the coils.

An embodiment of the invention where the thickness of the insulating film is reduced in the laminating direction of the iron core 20, will be described.

Figures 3A, 3B:
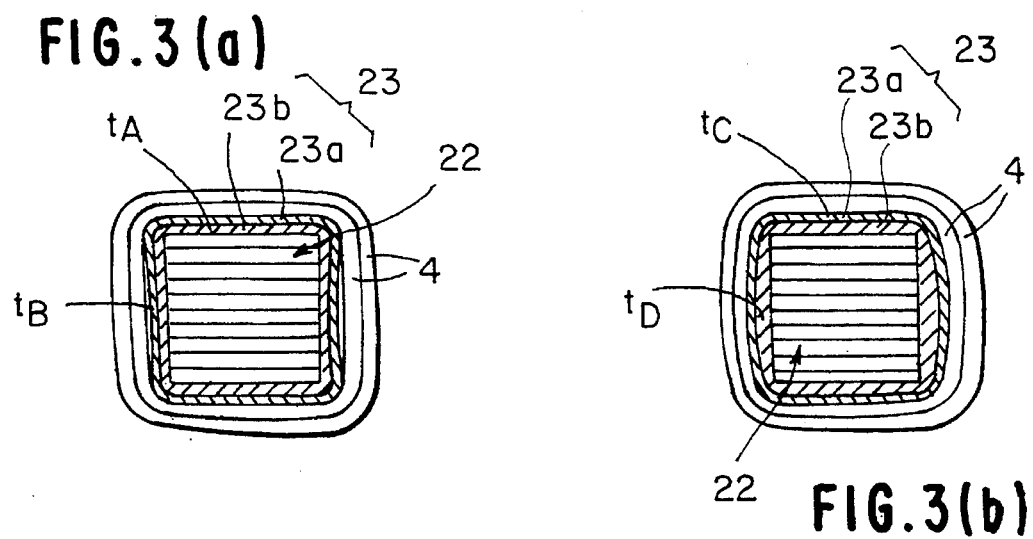

In the structure shown in FIG. 3(a), the top and bottom of the insulating film around the salient pole, when viewed in the laminating direction of the iron core, has an increased thickness $t_A$. The thickness $t_B$ of the mid portions of the insulating film, when viewed in the same direction, is equal to or smaller than the thickness $t_A$ of the top and bottom.

In this embodiment, the coil necessarily comes into contact with the insulating film at the top and bottom portions. In the mid portions, however, some turns of the coil will come in contact with the insulating film and some turns of the coil will not come in contact with the insulating film.

In a case of in FIG. 3(b), the thickness $t_D$ of the mid portions of the insulating film, when viewed in the same direction, is thicker than the thickness $t_C$ of the top and bottom of the insulating film. As a result, the number of turns of wire depends upon the thickness of mid portions and the torque coefficient is low.

The method of coating the liquid insulating material will be described with reference to FIG. 4.

The insulating material specified as mentioned above is used. The surfaces of the iron core 22 are coated with the insulating material in a multi-film fashion. To this end, a spray coating method is used.

In the spray coating method, compressed air is fed from a compressor (not shown) to a spray gun 34, and liquid insulating material (coating), together with the air, is sprayed therefrom in the form of powder toward the surface of the iron core 22.

More specifically, an upper shaft 32a of a tool 32 is inserted into the ring-like portion 21 of the iron core 22 to be coated with liquid insulating material (coating). Those elements are turned in unison by a motor 30.

The diameter D1 of the top end portion of the upper shaft 32a is slightly smaller than the inner diameter of the ring-like portion 21 of the iron core 22, allowing the coating to reach the inner side wall of the ring-like portion 21.

The diameter D2 of the bottom end or proximal portion of the upper shaft 32a is substantially equal to the inner diameter of the ring-like portion 21, thereby ensuring a reliable transfer of the rotation force from the motor 30 to the iron core 22.

Figure 4:
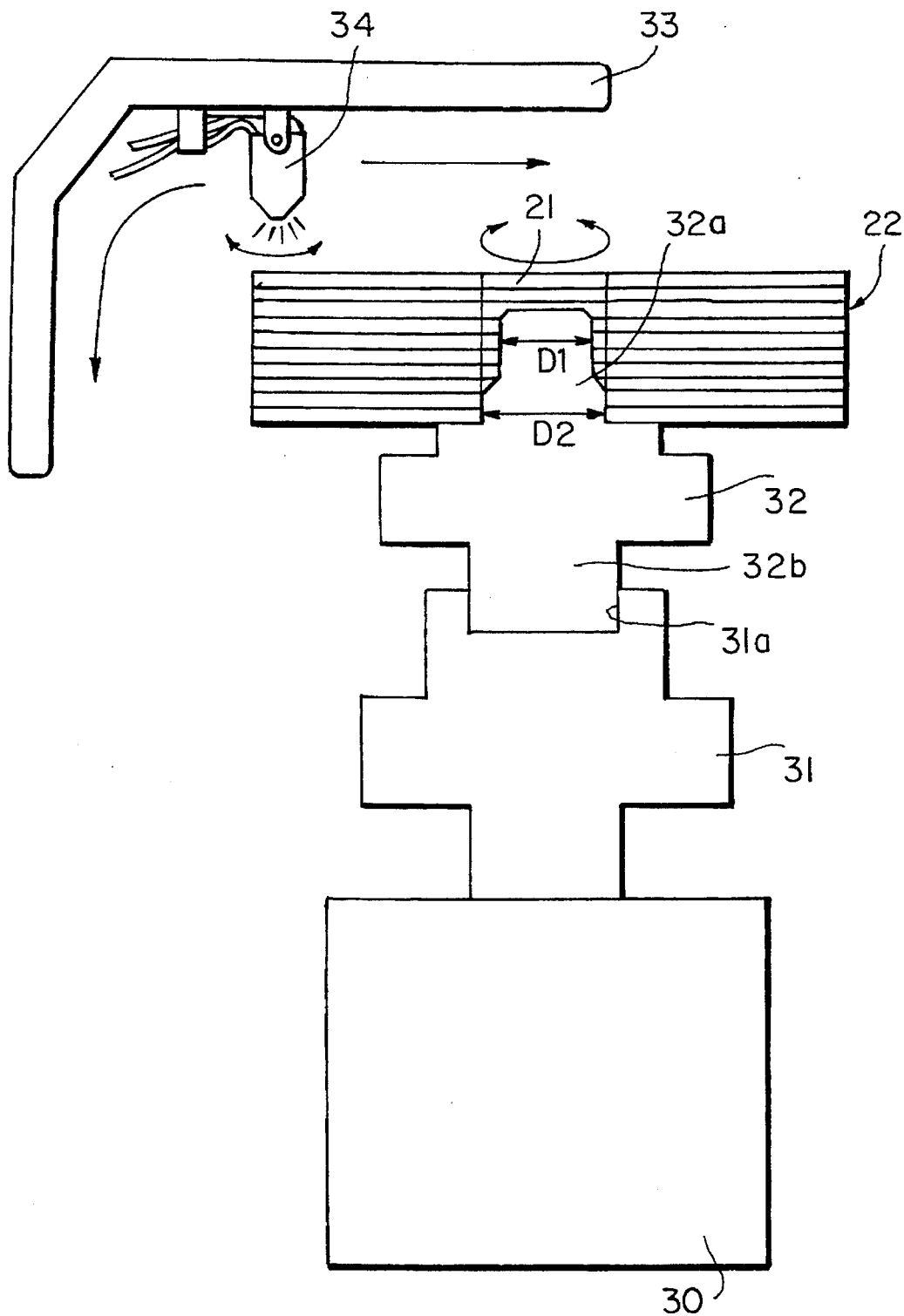
FIG. 4 is a diagram showing how to coat the surfaces of the salient poles with liquid insulating material.
Figure 5:
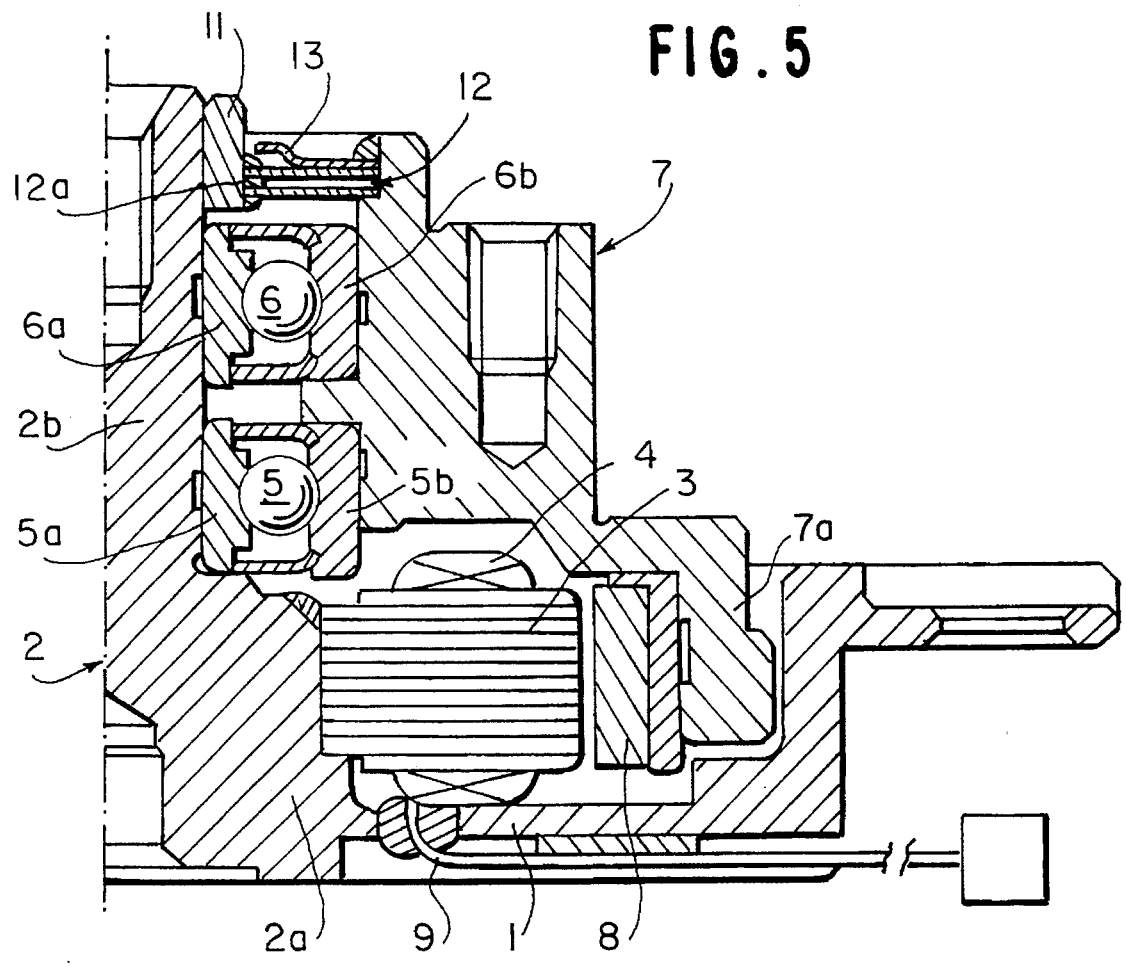
FIG. 5 is a sectional view showing a conventional magnetic disk drive device.
Figure 6:
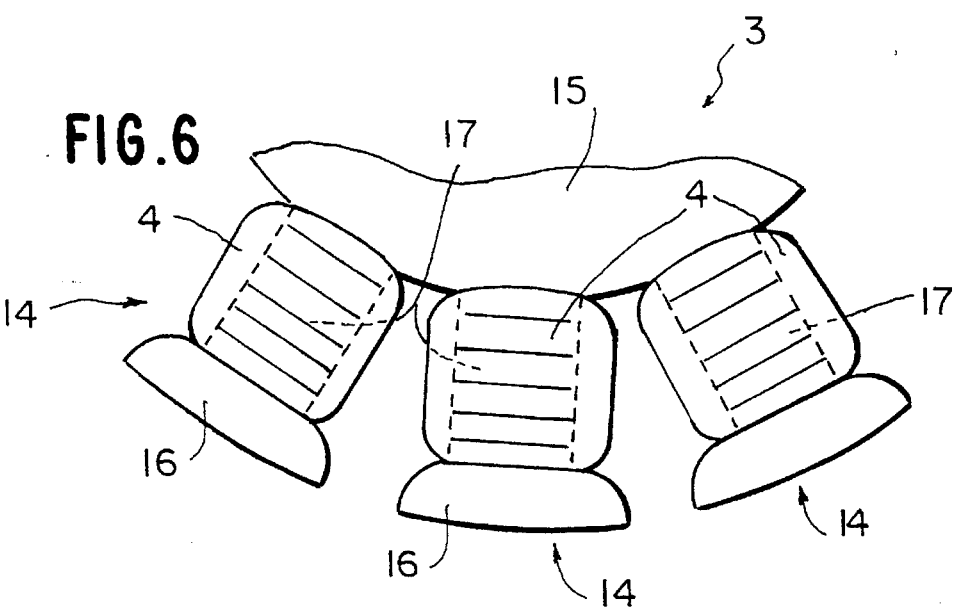
FIG. 6 is an enlarged plan view of a portion including an iron core and a coil put on the iron core.

The tool 32 has a lower shaft 32b on the lower side thereof, as shown in FIG. 4. The lower shaft 32b is fit into the output shaft 31 of the motor 30.

The motor 30 for rotating the iron core 22 is a general motor rotating at a low speed. The motor speed is determined in connection with a state of liquid insulating material and a compressing force of the spray gun 34. In this instance, it is 100 to 300 rpm.

The spray gun 34 for spraying the insulating material is mounted on a linear stepping motor 33 as a driving force generating means. It is movable horizontally and vertically with respect to the iron core 22.

The spray gun 34, as shown in FIG. 4, is tiltable with respect to the iron core 22 at a preset angle. The tilting motion enables the spray gun to coat even a difficult-to-coat portion.

A control unit, not shown, is used to control the motor speed of the motor 30, the linear stepping motor 33, and the inclination of the spray gun 34 and other portions of the spraying equipment.

To adjust the thickness of the coating, the moving speed of the spray gun 34 is varied. For example, to thin the insulating film, the moving speed of the spray gun 34 is slowed down.

Change of spraying distance, spraying angle, or the like may also be used for the film thickness adjustment.

The procedure of coating the iron core 22 will be described briefly.

The iron core 22 is set to the tool 32 manually or automatically. The iron core 22 set to the tool 32 is rotated at a preset speed, and the spray gun 34 is linearly moved at a preset speed by the linear stepping motor 33.

The spray gun 34 sprays liquid insulating material 23b in an atomized form toward the surface of the iron core 22.

The spray gun 34, while spraying liquid insulating material 23b, moves at a speed so controlled as to vary the thickness of the insulating film. Coating of much insulating material for a short time causes bubbles to tend to occur. The bubbles, if formed, form an exposed part of the surface of the iron core, possibly causing poor insulation and rust. The insulating material must be sprayed to such an extent that no bubble occurs.

After the spraying process, the product is left while being set to the machine. After a proper time, it is removed from the tool 32, and preparatorily sintered to form an insulating film of the insulating material 23b.

The iron core 22 is turned upside down. The portion of the iron core 22 which has not yet been coated is now coated with the insulating material in a similar manner.

The coating of the liquid insulating material 23a is carried out in a similar manner.

The iron core 22 with the insulating film as designed is transported to the next step of the manufacturing process.

The insulating film 23 formed by the above-mentioned method was 50 to 80 μm thick. The insulating resistance and breakdown voltage of the insulating film 23 were comparable with those of the conventional insulating film formed by the plastic coating method. The thickness of the insulating film 23 of the invention was thicker than that of the conventional one.

It is evident to those skilled in the art that the present invention is not limited to the embodiment as mentioned above, but may variously be changed, modified and altered within the scope of the invention.

While in the embodiment, twelve salient poles are used, use of at least six salient poles makes the invention effectively operable.

The insulating film, which is the combination of two films or is one film in the embodiment, may consist of any other combination than that combination.

In the above-mentioned embodiment, the hub is rotatably supported by the fixed shaft. The present invention is applicable to a structure where the hub and the shaft are rotated in unison.

As described above, in the magnetic disk drive device of the invention, the thickness of the insulating film is reduced on the narrowly spaced proximal portions of a multiple of the salient poles, so that a simple coating work is required for the proximal portions difficult to access by the tool, e.g., nozzle. The strength of the insulating film formed is sufficient. Accordingly, an excellent multi-layered insulating film can be formed on the iron core of the multi-pole structure. The resultant magnetic disk drive device is reliable.

With the feature of the reduced thickness of the insulating film on the narrowly spaced proximal portions of a multiple of the salient poles, the number of turns of the coil may be increased when comparing with that of the conventional device. This leads to increase of the motor torque in the magnetic disk drive device.

Further, the thickness $t_B$ of the mid portions of both sides of the insulating film around the pole is equal to or smaller than the thickness $t_A$ of the top and bottom of each side of the insulating film. The space between the adjacent poles, thus secured, provides an easy winding work of the coil.

What is claimed is:

1. A magnetic disk drive device comprising:

a rotatably supported hub for setting a magnetic disc adapted for rotation thereon;

a drive magnet secured to said hub;

an iron core disposed in opposition to said drive magnet, said iron core having a plurality of salient poles radially protruding from an outer circumferential portion of said iron core, a surface of said iron core being coated with a film made of liquid insulating material, a thickness of said insulating film on the proximal portion of each said salient pole being thinner than that of the insulating film on the distal portion of said salient pole.

2. The magnetic disk drive device as claimed in claim 1, in which the number of the salient poles is not more than six.

3. A magnetic disk as claimed in claim 1, wherein said film is a single layer film.

4. A magnetic disk as claimed in claim 1, wherein said film is a multilayered film.

5. A magnetic disk drive device comprising:

a rotatably supported hub for setting a magnetic disc adapted for rotation thereon;

a drive magnet secured to said hub;

an iron core disposed in opposition to said drive magnet, said iron core having a plurality of salient poles radially protruding from an outer circumferential portion of said iron core, a surface of said iron core being coated with a film made of liquid insulating material, a thickness of said insulating film formed on the mid portion in the laminating direction of said iron core being thinner than that of both end portions of said insulating film in the laminating direction.

6. A magnetic disk as claimed in claim 5, wherein said film is a single layer film.

7. A magnetic disk as claimed in claim 5, wherein said film is a multilayered film.

* * * * *